United States Patent [19]

Wamprecht et al.

[11] Patent Number: 5,045,602

[45] **Date of Patent: * Sep. 3, 1991**

[54] MOISTURE-HARDENING BINDER COMPOSITIONS CONTAINING COPOLYMERS AND BLOCKED POLYAMINES

[75] Inventors: Christian Wamprecht, Neuss; Harald Blum, Wachtendonk; Josef Pedain, Cologne, all of Fed. Rep. of Germany

[73] Assignee: Bayer Aktiengesellschaft, Leverkusen, Fed. Rep. of Germany

[ * ] Notice: The portion of the term of this patent subsequent to Jun. 26, 2007 has been disclaimed.

[21] Appl. No.: 511,671

[22] Filed: Apr. 20, 1990

[30] Foreign Application Priority Data

Apr. 26, 1989 [DE] Fed. Rep. of Germany ....... 3913679

[51] Int. Cl.[5] ..................... C08F 24/00; C08F 220/08; C08F 222/06

[52] U.S. Cl. ................................. 525/327.2; 525/207; 525/327.3; 525/327.4; 525/327.5; 525/327.6; 525/327.9; 525/375; 525/381; 525/382

[58] Field of Search .................. 525/327.2, 375, 327.6, 525/207, 327.4, 827.5

[56] References Cited

U.S. PATENT DOCUMENTS

| | | | |
|---|---|---|---|
| 4,043,956 | 8/1977 | Hutton et al. | 260/23 R |
| 4,279,793 | 7/1981 | Wellner | 260/18 R |
| 4,279,793 | 7/1981 | Wellner et al. | 260/18 R |
| 4,859,788 | 8/1989 | Brindöpke et al. | 588/398 |
| 4,882,391 | 11/1989 | Brindöpke | 525/327.2 |
| 4,945,137 | 7/1990 | Schäfer | 525/375 |

FOREIGN PATENT DOCUMENTS 0001088 3/1979 European Pat. Off. .

*Primary Examiner*—Joseph L. Schofer
*Assistant Examiner*—Fred Zitomer
*Attorney, Agent, or Firm*—Joseph C. Gil; Thomas W. Roy

[57] ABSTRACT

The present invention relates to moisture-hardening binder compositions containing A) 30 to 99 parts by weight of a component based on at least one copolymer prepared from olefinically unsaturated compounds having a weight average molecular weight of about 1,500 to 75,000 and containing chemically incorporated groups which are reactive with amino groups in an addition reaction and B) 1 to 70 parts by weight of a polyamine component based on at least one organic polyamine containing blocked amino groups.

characterized in that the copolymers of component A) contain both intramolecular carboxylic anhydride groups and also carbonate groups in chemically bound form, the anhydride equivalent weight of the copolymers being 327 to 9,800 and the carbonate equivalent weight of the copolymers being 465 to 18,600, component A) containing a total of 0.2 to 8 anhydride and carbonate groups for each blocked amino group present in component B).

11 Claims, No Drawings

MOISTURE-HARDENING BINDER COMPOSITIONS CONTAINING COPOLYMERS AND BLOCKED POLYAMINES

BACKGROUND OF THE INVENTION

1. Field of the Invention

The present invention relates to moisture-hardening binder compositions based on copolymers containing anhydride and carbonate groups and compounds containing blocked amino groups which are suitable for crosslinking the copolymers.

2. Description of the Prior Art

The use of compositions based on organic compounds containing at least two intramolecular carboxylic anhydride groups per molecule, especially copolymers containing succinic anhydride, and polyhydroxyl compounds as binders for paints and coating compositions is known from EPA-48 128. However, the possibility of applying the principle of this publication to the reaction of amines with anhydrides is complicated by the fact that the reaction of amines with anhydrides is a reaction which takes place very quickly at room temperature and which leads to crosslinked products with elimination of anhydride. The resulting extremely short pot lives have previously prevented polyanhydrides and polyamines from being used together in coating systems.

A possible solution to this problem is disclosed in DE-OS 2 853 477 which describes mixtures of blocked polyamines and polyanhydrides which have good pot lives and which harden on upon the addition of water to form crosslinked products. Ketimines or aldimines obtained by the reaction of polyamines with ketones or aldehydes are described as suitable blocked polaymines.

Compounds containing at least two cyclic carboxylic anhydride groups in the molecule, especially reaction products of polyols with cyclic dianhydrides, in which the ratio of hydroxyl to anhydride groups is 1:2, or copolymers of an unsaturated cyclic anhydride with polyunsaturated compounds or α-olefins are disclosed as suitable polyanhydrides.

The olefinically unsaturated compounds to be used in the production of the copolymers are only discussed in very broad terms in the general description of DE-OS 2 853 477. In particular, there is no disclosure of the quantities in which the individual monomers are to be used for the production of the copolymers. The examples are limited to copolymers of butadiene oil and maleic anhydride in a ratio of 1:1 and to copolymers of wood oil with maleic anhydride. However, these copolymers are attended by disadvantages because their combination with bis-ketimines or bis-aldimines results in heavily discolored products. In addition, coating compositions containing unsaturated oils, such as butadiene oil or wood oil, as the binder component lead to coatings which turn brittle very easily and are not weather-resistant.

In addition, the examples of DE-OS 2 853 477 demonstrate the use of dimethyl formamide as solvent in the processing of the binders specifically described therein at solids contents of only about 20%, which is unacceptably low.

Another possibility for increasing the pot life is to use oxazolidines instead of amines. Water-hardenable compositions of oxazolidines and polyanhydrides are disclosed in DE-OS 2 610 406 for use as water-hardenable sealing and adhesive compositions. Reaction products of polyunsaturated fatty acids with maleic anhydride and polyanhydrides of $C_{3-6}$ alkyl (meth)acrylate and maleic anhydride, especially of butyl acrylate and maleic anhydride, are described as especially preferred polyanhydrides.

The systems specifically described in DE-OS 2 610 406 need considerable improvement in regard to their suitability for the production of high-quality, colorless paint films which combine extreme hardness with high resistance to solvents and chemicals. This need for improvement applies both to the systems based on copolymers of maleic anhydride and butyl acrylate described in the examples and also to the systems based on reaction products of maleic anhydride with polyunsaturated fatty acid esters which result in end products which yellow.

The use of carbonate-functional compounds in combination with polyamines for paints and coating systems is known, for example, from EP-A-1088. However, the reactivity of these binder combinations needs to be improved. When hardening is carried out at room temperature, crosslinking is either inadequate or requires very long reaction times, even in the presence of catalysts.

EP-A-286 933 describes special hardening components (A) for compounds containing epoxide or cyclic carbonate groups which are distinguished by the fact that the hardening component (A) is a reaction product of (a1) CH-active alkyl esters or adducts of CH-active alkyl esters and isocyanates with (a2) polyamines.

Accordingly, an object of the present invention is to provide new binder compositions which are suitable for the production of high-quality, optionally moisture-hardening systems having good pot lives. It is a further object of the present invention to provide binder compositions which result in coatings which are clear, colorless, non-yellowing and solvent-resistant.

These objects have been achieved in accordance with the present invention as described hereinafter. Previously unknown copolymers containing both anhydride and carbonate groups in chemically incorporated form are present as component A) in the binder compositions according to the invention. Hardening component B) is based on compounds containing blocked amino groups which are capable of activation in the presence of moisture.

SUMMARY OF THE INVENTION

The present invention relates to moisture-hardening binder compositions containing A) 30 to 99 parts by weight of a component based on at least one copolymer prepared from olefinically unsaturated compounds having a weight average molecular weight of about 1,500 to 75,000 and containing chemically incorporated groups which are reactive with amino groups in an addition reaction and B) 1 to 70 parts by weight of a polyamine component based on at least one organic polyamine containing blocked amino groups, characterized in that the copolymers of component A) contain both intramolecular carboxylic anhydride groups and also carbonate groups in chemically bound form, the anhydride equivalent weight of the copolymers being 327to 9,800and the carbonate equivalent weight of the copolymers being 465 to 18,600, component A) containing a total of 0.2 to 8 anhydride and carbonate groups for each blocked amino group present in component B).

DETAILED DESCRIPTION OF THE INVENTION

Copolymer component A) is based on at least one copolymer containing both carbonate groups and also intramolecular anhydride groups in copolymerized form. The molecular weight of these copolymers, determined as a weight average by gel permeation chromatography, is about 1,500 to 75,000, preferably about 3,000 to 50,000 and more preferably about 3,000 to 25,000. The carbonate equivalent weight (i.e., the quantity in "g" containing 1 mole of carbonate groups) is 465!o 18,600, preferably 1,275 to 9,560 and the anhydride equivalent weight (i.e., the quantity in "g" containing 1 mole of anhydride groups) is 327to 9800, preferably from 817 to 3,270.

The copolymers present in component A) are preferably produced in the presence of organic solvents. The polymerization medium may be formed with known solvents used in the paint industry which are inert to the monomers and copolymers under the polymerization conditions.

Preferred monomer mixtures for the production of the copolymers contain a) 1 to 30 parts by weight of copolymerizable monomers containing anhydride groups,
b) 1to 40 parts by weight of copolymerizable monomers containing carbonate groups and
c) 30 to 98 parts by weight of other copolymerizable monomers corresponding to the formulas:

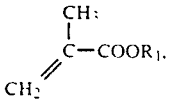

I

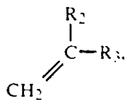

II

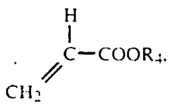

III wherein $R_1$ is a linear or branched, aliphatic $C_{1-18}$ hydrocarbon radical, or a cycloaliphatic $C_5$–$C_{10}$ hydrocarbon radical $R_2$ is hydrogen, a methyl or ethyl group or a chlorine or fluorine atom, $R_3$ is an aromatic $C_{6-12}$ hydrocarbon radical (including aromatic radicals containing aliphatic substituents), a nitrile group, a $C_{2-9}$ carboxylate group, a $C_{2-7}$ alkoxy group or an aminocarbonyl group which may be substituted at the nitrogen b $C_{1-6}$ alkyl substituents which may contain ether groups and $R_4$ corresponds to the definition of $R_1$, but need not be identical to $R_1$.

Suitable examples of monomers a) include itaconic anhydride and maleic anhydride; maleic anhydride is preferred.

Suitable monomers b) include organic compounds which contain at least one, preferably only one, olefinic double bond capable of copolymerization and least one, preferably only one, carbonate group. In the context of the invention, "carbonate groups" are understood to be cyclic carbonate groups corresponding to the formula

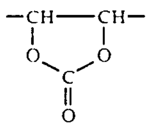

IV which are preferably arranged terminally in the monomers b), i.e. correspond to the formula

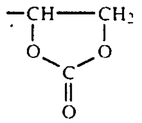

V

Suitable monomers b) include compounds corresponding to the formula

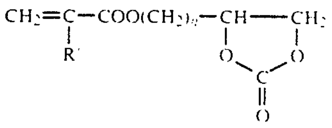

VI wherein

R' is hydrogen or a methyl group, preferably a methyl group, and n is an integer from 1 to 6, preferably 1.

These compounds are known and may be produced by known methods of the type described, for example, in U.S. Pat. No. 2,967,173, U.S. Pat. No. 2,856,413, DE-PS 845 937 or DE-OS 3 529 263. The particularly preferred monomer b) is (2-oxo-1,3-dioxolan-4-yl)methyl methacrylate, which may be obtained by the processes disclosed in U.S. Pat. No. 2,967,173, EP-A-1088 or DE-OS 3 529 263.

Particularly suitable monomers c) are those corresponding to the formulas I, II and III wherein $R_1$ is a linear or branched, aliphatic $C_{1-8}$ hydrocarbon radical, or a cyclohexyl radical, $R_2$ is hydrogen or a methyl group, $R_3$ corresponds to the definition previously set forth and $R_4$ corresponds to the definition $R_1$, but need not be identical to $R_1$.

Examples of preferred substituents $R_1$ and $R_4$ are methyl, ethyl, n-propyl, isopropyl, n-butyl, isobutyl, n-pentyl, cyclohexyl n-hexyl, 2-ethylhexyl, n-octyl, n-decyl and n-dodecyl radicals.

Examples of preferred substituents $R_3$ are the aliphatic radicals set forth for $R_1$ (except for hydrogen and methyl), and also phenyl, 2-, 3- and 4-methylphenyl, propoxy, n-butoxy, acetyl, propionyl, n-butyryl and N-methoxymethyl aminocarbonyl radicals.

Particularly preferred copolymers are those containing a) 1 to 30 parts by weight, preferably 3 to 20 parts by weight of maleic anhydride,
b) 1 to 40 parts by weight, preferably 2 to 30 parts by weight of (2-oxo-1,3-dioxolan-4-yl)-methyl methacrylate and
c) 30 to 98 parts by weight, preferably 50 to 95 parts by weight of monomers corresponding to formulas I, II and III.

Other particularly preferred copolymers for component A) are those containing 40 to 140 parts by weight of other monomers such as styrene; vinyl toluene; α-methyl styrene; α-ethyl styrene; nucleus-substituted diethyl styrenes, isopropyl styrenes, butyl styrenes and methoxystyrenes and mixtures thereof; ethyl vinyl ether; n-propyl vinyl ether; isopropyl vinyl ether; n-butyl vinyl ether; isobutyl vinyl ether; vinyl acetate; vinyl propionate; vinyl butyrate; and mixtures of these monomers, in addition to (2-oxo-1,3-dioxolan-4-yl)-methyl methacrylate, are present per 100 parts by weight of maleic anhydride.

Suitable solvents for carrying out the copolymerization include esters such as ethyl acetate, propyl acetate, butyl acetate, isopropyl acetate, isobutyl acetate, sec.-butyl acetate, amyl acetate, hexyl acetate, heptyl acetate, benzyl acetate, ethyl propionate, butyl propionate, methyl glycol acetate, ethyl glycol acetate, butyl glycol acetate, ethyl diglycol acetate, ethyl glycol acetate, methyl diglycol acetate, butyl diglycol acetate, butyrolactone and propylene glycol methyl ether acetate; ethers such as diisopropyl ether, dibutyl ether, tetrahydrofuran, dioxane and dimethyl diglycol; hydrocarbons such as solvent naphtha, terpenes, cyclohexane, toluene, xylene and ethylbenzene; ketones such as acetone, methyl ethyl ketone, methyl isobutyl ketone, methyl n-amyl ketone, methyl isoamyl ketone, diethyl ketone, ethyl butyl ketone, diisopropyl ketone, cyclohexanone, methyl cyclohexanone and isophorone; and mixtures of these solvents.

The copolymerization is normally carried out at a solids content of 30 to 95% by weight.

In general, a portion or all of the solvent is initially introduced into the reactor and the monomer mixture, initiator and optionally the remaining portion of the solvent are then continuously added. On completion of the addition, the mixture is stirred. The polymerization is terminated after a monomer conversion of at least 96%, preferably at least 99%. It may be necessary to reactivate the polymerization by subsequent addition of small quantities of initiator to achieve the desired monomer conversion. With certain starting monomer compositions, relatively large quantities of residual maleic anhydride monomers may be present in the copolymer after the polymerization. Should this interfere with the desired application or adversely affect the properties, it is advantageous to reduce this residual monomer content either by distillation or by reactivation with initiator, optionally with simultaneous addition of small quantities of a monomer mixture which readily copolymerizes with maleic anhydride, such as styrene or butyl acrylate.

Part of the maleic anhydride may also be initially introduced with the solvent or maleic anhydride may be added at a faster rate than the other monomers. In certain cases, these modified production processes can improve the compatibility of the components of the binder composition.

The monomer conversion is measured by determination of the solids content of the reaction mixture and may be verified by analysis of the residual monomers by gas chromatography.

It is preferred to use radical formers which are suitable for reaction temperatures of about 60° to 180° C., for example, organic peroxides such as dibenzoyl peroxide, di-tert.-butyl peroxide, dilauryl peroxide, tert.-butylperoxy-2-ethyl hexanoate, tert.-butylperoxy maleate, tert.-butylperoxybenzoate, dicumyl peroxide and didecanoyl peroxide; and azo compounds such as 2,2'-azo-bis-(2,4-dimethylvaleronitrile), 2,2'-azo-bis-(isobutyronitrile), 2,2'-azo-bis-(2,3-dimethylbutyronitrile) and 1,1'-azo-bis-(1-cyclohexanenitrile)

The initiators are generally used in quantities of about 0.5 to 12% by weight, based on weight of the monomers. Molecular weight regulators, such as n-dodecyl mercaptan and tert.-dodecyl mercaptan, may optionally be used in quantities of 0 to about 3% by weight.

The hardener component B) is based on at least one compound containing blocked amino groups capable of activation under the effect of moisture. Examples of such groups include aldimine, ketimine, oxazolidine, hexahydropyrimidine and tetrahydroimidazole groups and mixtures thereof.

The blocked polyamines of component B) have a weight average molecular weight of 86 to about 10,000, preferably about 250 to 4,000. The molecular weight may be calculated from the stoichiometry of the starting materials used for the production of the compounds for molecular weights up to about 1,000 or by the gel permeation chromatography for molecular weights above about 1,000. The blocked polyamines contain on an average of 1 to 50, preferably 2 to 10 and more preferably 2 to 4 structural units corresponding to the formulas

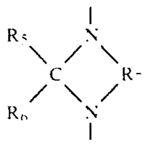 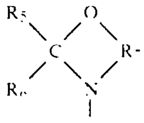 and or 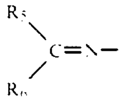

VII VIII IX wherein $R_5$ and $R_6$ may be the same or different and represent hydrogen, aliphatic $C_{1-18}$ hydrocarbon radicals, cycloaliphatic $C_{5-10}$ hydrocarbon radicals, araliphatic $C_{7-18}$ hydrocarbon radicals or phenyl radicals; the two substituents $R_5$ and $R_6$ together with the adjacent carbon atom may also form a 5- or 6-membered cycloaliphatic ring; preferably at most one of the substituents is hydrogen, and $R_7$ is a difunctional aliphatic hydrocarbon radical containing 2 to 6 carbon atoms, provided that 2 or 3 carbons are arranged between the two nitrogen atoms.

Preferred components B) are those containing the hexahydropyrimidine or tetrahydroimidazole structures corresponding to formula VII wherein $R_5$ and $R_6$ may be the same or different and represent aliphatic $C_{2-10}$ hydrocarbon radicals and one of these two substituents may be hydrogen, and $R_7$ is an ethylene or trimethylene group.

The blocked polyamines are produced in known manner by reacting the corresponding aldehydes or ketones with the corresponding polyamines.

Aldehydes or ketones suitable for the production of the compounds B) containing hexahydropyridimine or tetrahydroimidazole groups include those corresponding to the formula

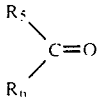 X wherein the ketones preferably have a molecular weight of 72 to 200 and the aldehydes preferably have a molecular weight of 58 to 250.

Examples of these aldehydes and ketones include acetone, methyl ethyl ketone, methyl propyl ketone, methyl isopropyl ketone, methyl-n-butyl ketone, methyl isobutyl ketone, methyl-n-amyl ketone, methyl isoamyl ketone, methyl heptyl ketone, diethyl ketone, ethyl butyl ketone, ethyl amyl ketone, diisopropyl ketone, diisobutyl ketone, cyclohexanone, isophorone, methyl tert.-butyl ketone, 5-methyl-3-heptanone, 4-heptyl ketone, 1-phenyl-2-propanone, acetophenone, methyl nonyl ketone, 3,3,5-trimethyl cyclohexanone, formaldehyde, acetaldehyde, propionaldehyde, butyraldehyde, isobutyraldehyde, trimethyl acetaldehyde, 2,2-dimethyl propanal, 2-ethyl hexanal, 3-cyclohexene-1-carboxaldehyde, hexanal, heptanal, octanal, valeraldehyde, benzaldehyde, tetrahydrobenzaldehyde, hexahydrobenzaldehyde, acrolein, croton aldehyde, propargyl aldehyde, p-tolyl aldehyde, 2-methyl pentanal, 3-methyl pentanal, phenyl ethanal and 4-methyl pentanal.

Preferred aldehydes and ketones for the production of the compounds containing hexahydropyrimidine or tetrahydroimidazole groups are butyraldehyde, isobutyraldehyde, trimethyl acetaldehyde, 2,2-dimethyl propanal, 2-ethyl hexanal, hexanal, 3-cyclohexane-1-carboxaldehyde, heptanal, octanal, hexahydrobenzaldehyde, 2-methyl pentanal, cyclohexanone, cyclopentanone, methyl isopropyl ketone, acetone, 3,3,5-trimethyl cyclohexanone and methyl cyclohexanone.

It is also possible to use mixtures of different ketones or aldehydes and also mixtures of ketones with aldehydes to obtain special properties.

The polyamines used for the production of the compounds containing hexahydropyrimidine or tetrahydroimidazole groups, are organic compounds containing at least two primary and/or secondary amino groups.

Suitable polyamines include those corresponding to the formula $$R_8-NH-R_7-NH-R_9 \qquad XI$$

wherein $R_7$ is as defined above and $R_8$ and $R_9$ may be the same or different and represent hydrogen, aliphatic hydrocarbon radicals containing 1 to 10 and preferably 1 to 4 carbon atoms, cycloaliphatic hydrocarbon radicals containing 5 to 10 and preferably 6 carbon atoms or aromatic hydrocarbon radicals containing 7 to 15 and preferably 7 carbon atoms; these hydrocarbon radicals mentioned, especially the aliphatic hydrocarbon radicals, may optionally contain heteroatoms, such as oxygen, nitrogen or sulfur in the form of ether, ester, amide, urethane, oxirane, ketone, lactam, urea, thioether, thioester or lactone groups, and may also contain reactive hydroxyl or amino groups.

Preferred polyamines are those in which $R_8$ and $R_9$ may be the same or different and represent hydrogen or alkyl radicals such as methyl, ethyl, n-propyl, isopropyl, n-butyl, isobutyl, tert.-butyl, n-pentyl or n-hexyl radicals, or in which one of the substituents $R_8$ and $R_9$ is a radical of the type obtained by the addition of an amine hydrogen atom onto an olefinically unsaturated compound. Olefinically unsaturated compounds suitable for the production of these modified polyamines include derivatives of (meth)acrylic acid such as esters, amides and nitriles; aromatic vinyl compounds such as styrene, α-methyl styrene and vinyl toluene; vinyl esters such as vinyl acetate, vinyl propionate and vinyl butyrate; vinyl ethers such as ethyl vinyl ether, propyl Vinyl ether and butyl vinyl ether; and monoesters and diesters of fumaric acid, maleic acid and tetrahydrophthalic acid. $R_8$ and/or $R_9$ may also represent an aminoalkyl or hydroxyalkyl radical, preferably containing 2 to 4 carbon atoms.

Particularly preferred polyamines are ethylenediamine, 1,2-propylenediamine, 1,3-propylenediamine, 1,2- and 1,3-butylenediamine, diethylenetriamine and derivatives of these polyamines.

Compounds containing oxazolidine groups, which correspond to formula VIII and are suitable as component B), are preferably those wherein $R_5$ and $R_6$ may be the same or different and represent hydrogen or aliphatic hydrocarbon radicals containing 1 to 18, preferably 1 to 8 carbon atoms, or in which the substituents $R_5$ and $R_6$ together with the carbon atom of the heterocyclic ring form a cycloaliphatic ring containing 4 to 9 carbon atoms, preferably a cyclohexane ring, provided that at most one of the substituents $R_5$ or $R_6$ is hydrogen, and wherein $R_7$ is a $C_{2-4}$, preferably $C_{2-3}$ alkylene radical, provided that at least two carbon atoms are arranged between the oxygen atom and the nitrogen atom.

The oxazolidine-containing compounds are produced in known manner by reacting the aldehydes or ketones which correspond to formula X with suitable hydroxyamines set forth hereinafter.

Suitable aldehydes or ketones include those previously set forth with regard to formula X. Preferred aldehydes or ketones for preparing the oxazolidine-containing compounds include butyraldehyde, isobutyraldehyde, trimethyl acetaldehyde, 2,2-dimethyl propanal, 2-ethyl hexanal, 3-cyclohexene-1-carboxaldehyde, hexahydrobenzaldehyde, cyclopentanone, cyclohexanone, methyl cyclopentanone, methyl cyclohexanone, 3,3,5-trimethyl cyclohexanone, cyclobutanone, methyl cyclobutanone, acetone, methyl ethyl ketone and methyl isobutyl ketone.

It is also possible to use mixtures of different ketones or aldehydes and also mixtures of ketones with aldehydes to obtain special properties.

Preferred hydroxyamines are organic compounds containing at least one aliphatic amino group and at least one aliphatically bound hydroxyl group. Although hydroxyamines containing aromatically or cycloaliphatically bound amino or hydroxyl groups may also be used, they are less preferred. The hydroxyamines generally have a molecular weight of 61 to 500, preferably 61 to 300.

Suitable hydroxyamines include bis-(2-hydroxyethyl)-amine, bis-(2-hydroxypropyl)-amine, bis-(2-hydroxybutyl)-amine, bis-(3-hydroxypropyl)-amine, bis-(3-hydroxyhexyl)-amine, N-(2-hydroxypropyl)-N-(2-hydroxyethyl)-amine, 2-(methylamino)ethanol, 2-(ethylamino)-ethanol, 2-(propylamino)-ethanol, 2-(butylamino)-ethanol, 2-(hexylamino)-ethanol, 2-(cyclohexyl-amino)-ethanol, 2-amino-2-methyl-1-propanol, 2-amino-2-ethylo 1-propanol, 2-amino-2-propyl-1-propanol, 2-amino-2-methyl-propane-1,3-diol, 2-amino-3-methyl-3-hydroxybutane, propanolamine and ethanolamine.

Preferred hydroxyamines are bis-(2-hydroxyethyl)-amine, bis-(2-hydroxypropyl)-amine, bis-(2-hydroxybutyl)-amine, bis-(3-hydroxyhexyl)-amine, 2-(methylamino)-ethanol, 2-(ethylamino)-ethanol, 2-amino-2-methyl-1-propanol, 2-amino-2-ethyl-1-propanol, propanolamine and ethanolamine.

Preferred compounds containing aldimine or ketimine groups are those which contain structural units corresponding to

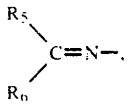

IX wherein $R_5$ and $R_6$ may be the same or different and represent hydrogen or aliphatic hydrocarbon radicals which may be attached together with the carbon atom to form a cycloaliphatic ring, preferably a cyclohexane ring.

Suitable aldehydes or ketones for the preparation of these compounds are those previously set forth with regard to formula X. Preferred aldehydes or ketones are butyraldehyde, isobutyraldehyde, trimethyl acetaldehyde, 2,2-dimethyl propanal, 2-ethyl hexanal, 3-cyclohexene-1-carboxaldehyde, hexahydrobenzaldehyde and, in particular, ketones which have a boiling point below 170.C and which possess good volatility at room temperature such as methyl isobutyl ketone, methyl isopropyl ketone, diethyl ketone, diisobutyl ketone and methyl tert.-butyl ketone.

It is also possible to use mixtures of different ketones or aldehydes and also mixtures of ketones with aldehydes to obtain special properties.

The polyamines used for the production of component B) containing ketimine or aldimine groups are preferably organic compounds containing at least two aliphatically and/or cycloaliphatically bound primary amino groups. Although polyamines containing aromatically bound amino groups may also be used, they are less preferred. The polyamines generally have a molecular weight of 60 to 500, preferably of 88 to 400, although amine-terminated prepolymers having a higher molecular weight may also be used as the polyamine for the production of component B).

Particularly preferred polyamines are diprimary aliphatic and/or cycloaliphatic diamines such as tetramethylenediamine, hexamethylenediamine, isophoronediamine, bis-(4-aminocyclo-hexyl)-methane, bis-aminomethyl hexahydro-4,7-methanoindane, 1,4-cyclohexanediamine, 1,3-cyclohexanediamine, 2-methyl cyclohexanediamine, 4-methyl cyclohexanediamine, 2,2,5-trimethyl hexanediamine, 2,2,4-trimethyl hexanediamine, butane-1,4-diol bis-(3-aminopropyl)-ether, 2,5-diamino-2,5-dimethylhexane, bis-aminomethyl cyclohexane, bis-(4-amino-3,5-dimethyl cyclohexyl)-methane and mixtures thereof.

Tetramethylenediamine, hexamethylenediamine, isophoronediamine, bis-aminomethyl cyclohexane, 1,4-cyclohexanediamine, bis-aminomethyl hexahydro-4,7-methanoindane and bis-(4-aminocyclohexyl)-methane are most preferred.

In addition to these preferred diamines, prepolymers containing terminal primary amino groups, i.e., compounds containing at least two terminal primary amino groups and having a molecular weight of about 500 to 5,000, preferably about 500 to 2,000, may also be used for the production of the aldimines or ketimines. These compounds include the aminopolyethers known from polyurethane chemistry, e.g., those described in EP-A-0 081 701 (U.S. Pat. No. 4,774,263, herein incorporated by reference). Other examples include reaction products containing at least two primary amino groups and also amide, urea, urethane or secondary amino groups which are prepared from at least difunctional carboxylic acids, isocyanates or epoxides with the diamines previously set forth. Mixtures of these relatively high molecular weight polyamines with the low molecular weight polyamines previously set forth may also be used.

Examples of aromatic polyamines which are less preferred for the production of the aldimines or ketimines include 2,4- and/or 2,6-diaminotoluene, 1,4-diaminobenzene and 4,4'-diaminodiphenyl methane.

Component B), which may contain aldimine, ketimine, oxazolidine, hexahydropyrimidine or tetrahydroimidazole groups, is prepared by reacting the starting components in quantities such that the amino compounds, based on the particular reaction required, are present in a 1- to 1.5-fold molar excess, based on the carbonyl groups. Catalytic quantities of acidic substances (such as p-toluenesulfonic acid, hydrochloric acid, sulfuric acid, aluminium(III) chloride and tin compounds) may optionally be used to accelerate the reaction.

The reaction is generally carried out at a temperature of about 60° to 180° C. in the presence of an entraining agent to remove the water of reaction until the calculated quantity of water has been removed or until no more water is removed. The entraining agent and any unreacted starting materials are then removed by distillation. Suitable entraining agents include toluene, xylene, cyclohexane and octane. The crude products obtained may be used without further purification as component B) for the production of the binder composition. When the purity of component B) has to meet particularly stringent requirements, it is also possible to obtain component B) in pure form, for example by distillation.

The blocked polyamines of component B) also include those which contain from 2 to 10 structural units corresponding to formulas VII, VIII and IX and which are obtained by modifying these structural elements to form groups such as ester, ether, amide, urea and/or urethane groups.

Structural units of formulas VII, VIII and IX which are suitable for this modification must contain at least one primary or secondary amino group or a hydroxyl group in non-blocked form. Suitable modifying agents for the production of these relatively high molecular weight compounds which are suitable for use as component B) include polyisocyanates, polyepoxides, polycarboxylic acids and polyacryloyl compounds.

Suitable polyisocyanate modifying agents include aliphatic, cycloaliphatic, araliphatic, aromatic and heterocyclic polyisocyanates of the type described, for example, by W. Siefken in Justus Liebigs Annalen der Chemie, 562, pp. 75–136. Examples include 1,4-tetramethylene diisocyanate, 1,6-hexamethylene diisocyanate, 1,12-dodecane diisocyanate, cyclobutane-1,3-diisocyanate, cyclohexane-1,3- and/or -1,4-diisocyanate, 1-isocyanato-3,3,5-trimethyl-5-isocyanatomethyl cyclohexane, 2,4- and/or 2,6-hexahydrotoluylene diisocyanate, hexahydro-1,3- and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenyl methane-2,4'- and/or -4,4'-diisocyanate, naphthylene-1,5-diisocyanate, polyisocyanates containing carbodiimide groups (DE-OS 10 92 007), polyisocyanates containing allophanate groups (GB-PS 944,890), polyisocyanates containing isocyanurate groups (DE-PS 10 22 789 and DE-PS 12 22 067), polyisocyanates containing urethane groups (U.S. Pat. No. 3,394,164) or polyisocyanates obtained by reacting at least difunctional hydroxy compounds with an excess of at least difunctional isocyanates, polyisocyanates containing biuret groups (DE-PS 11 01 394), prepolymeric or polymeric substances containing at least two isocyanate groups and mixtures of any of the preceding polyisocyanates.

Representatives of these compounds which may be used in accordance with the invention are described in High Polymers, Vol. XVI, "Polyurethanes, Chemistry and Technology," Interscience Publishers, New York, London, Vol. I, 1962, pp. 32–42 and 45–54 and Vol. II, 1964, pp. 5–6 and 198–199 and in Kunststoffhandbuch, Vol. VII, Vieweg-Hochtlen, Carl-Hanser-Verlag, Munchen, 1966, pp. 45–72.

Suitable polyepoxide modifying agents include aliphatic, cycloaliphatic, araliphatic, aromatic and heterocyclic compounds containing at least two epoxide groups such as epoxidized esters of aliphatic polybasic acids with unsaturated monohydric alcohols, glycidyl ethers of polyhydroxy compounds, glycidyl esters of polycarboxylic acids and copolymers containing epoxide groups.

Suitable polycarboxylic acid modifying agents include aliphatic, cycloaliphatic, araliphatic, aromatic and heterocyclic compounds containing at least two carboxyl groups such as adipic acid, dimer fatty acid, phthalic acid, terephthalic acid, isophthalic acid, fumaric acid, maleic acid, succinic acid, trimellitic acid, pyromellitic acid, copolymers containing (meth)acrylic acid, acidic polyesters and acidic polyamides. Instead of using the free acids, the corresponding anhydrides (provided that the acids form intramolecular anhydrides) or the corresponding alkyl esters, especially methyl esters, may also be used for the modification reaction.

Compounds containing at least two olefinic double bonds which are suitable as modifying agents include derivatives of acrylic or methacrylic acid such as hexanediol bis-(meth)acrylate, trimethylol propane tris-(meth)acrylate,* pentaerythritol tetra(meth)acrylate; OH-functional polyesters or polyacrylates esterified with acrylic acid and diethylene glycol dimethacrylate; and reaction products of polyisocyanates with hydroxyalkyl (meth)acrylate.

In the modification reaction for the production of component B), it is also possible to use mixtures of different blocked amines each containing at least one free hydroxyl or amino group capable of reacting with the modifying agent.

Polyamines containing ketimine or aldimine groups and at least one free primary or secondary amino group or a free hydroxyl group may be obtained by reacting at least difunctional amines with ketones and/or aldehydes in equivalent ratios such that at least one amino group remains free.

When polyamines containing at least one secondary amino group in addition to primary amino groups are reacted with aldehydes or ketones at an equivalent ratio of primary amino groups to carbonyl groups of 1:1, the aldimines or ketimines obtained contain at least one free secondary amino group. If the equivalent ratio of primary amino groups to carbonyl groups is greater than 1:1, the aldimines or ketimines will contain free primary amino groups in addition to at least one secondary amino group. Polyamines which contain primary and secondary amino groups include diethylenetriamine, triethylenetetramine, tetraethylenepentamine, dipropylenetriamine and tripropylenetetramine.

Compounds containing oxazolidine groups and also at least one reactive primary or secondary amino group or a hydroxy group may be obtained from the reaction of hydroxyamines which, in addition to a hydroxy group and a secondary amino group, also contain at least one other hydroxy group and/or primary or secondary amino group or from the reaction of suitable hydroxyamines containing a hydroxy group and a primary amino group in appropriate equivalent ratio with ketones and/or aldehydes. Suitable hydroxyamines include bis-(2-hydroxy-ethyl)-amine, bis-(2-hydroxy-propyl)-amine, bis-(2-hydroxy-butyl)-amine, bis-(3-hydroxypropyl)-amine, bis-(3-hydroxy-hexyl)-amine, N-(2-hydroxypropyl)-N-(6-hydroxyhexyl)-amine, 2-amino-2-methyl-1-propanol, 2-amino-2-methylpropane-1,3-diol, 2-amino-3-methyl-3-hydroxybutane and aminoethanol.

The hydroxyamines containing oxazolidine groups which also contain at least one free primary or secondary amino group or a hydroxy group may be prepared by reacting the starting components mentioned at an equivalent ratio of amino or hydroxy groups to aldehyde or ketone groups such that at least one primary or secondary amino group or a hydroxy group is not blocked and is available for the subsequent reaction with the reactant used as the modifying agent.

Compounds containing hexahydropyrimidine or tetrahydroimidazole groups and also at least one reactive primary or secondary amino group or a hydroxy group may be obtained from hydroxyamines which, in addition to at least one hydroxy group, contain two secondary amino groups, such as N-methyl-N'-4-(hydroxybuty)-tetramethylendiamine; and from polyamines which, in addition to at least one secondary amino group, contain at least one primary amino group or at least two other secondary amino groups, such as N-ethyl-1,3-diaminoethane, N-methyl-1,3-diaminopropane, N-methyl -1,3-diaminebutane, diethylenetriamine, N-methyl diethylenetriamine, 3,3'-diaminodipropylamine, N,N'-dimethyl diethylenetriamine.

The compounds containing hexahydropyrimidine or tetrahydroimidazole groups and also at least one free primary or secondary amino group or a hydroxyl group are prepared by reacting the starting compounds mentioned at an equivalent ratio of amino or hydroxy groups to aldehyde or ketone groups such that at least one primary or secondary amino group or a hydroxyl group is not blocked and is available for subsequent reaction with the reactant used as the modifying agent.

If the modifying agents previously set forth are reacted with hexahydropyrimidines or tetrahydroimidazoles containing free primary or secondary amino or hydroxyl groups, hexahydropyrimidines or tetrahydroimidazoles of relatively high functionality are formed. The same applies to the modification of aldimines or ketimines and to the modification of oxazolidines.

If the modifying agents are reacted with mixtures of hexahydropyrimidines, tetrahydroimidazoles, aldimines, ketimines and/or oxazolidines containing free primary or secondary amino or hydroxyl groups, then hexahydropyrimidines, tetrahydroimidazoles, ketimines, aldimines and/or oxazolidines which are chemically crosslinked with each another are obtained for use as component B). Accordingly, a variety of different compounds which may be used as component B) can be obtained by these modification or crosslinking reactions.

The modification reaction is normally carried out in a solvent such as those previously set forth at reaction temperatures of about 30° to 180° C. The reaction is optionally carried out using a water separator.

In general, a 1:1 ratio of reactive groups of the blocked polyamines to the reactive groups of the "modifying agent" is selected. However, it is also possible to use the "modifying agent" in a substoichiometric quantity of 0.75 to 0.99.

The binder compositions according to the invention may also contain catalysts C) as a further constituent. Suitable catalysts include tertiary amines having a molecular weight of 89 to 1,000 such as 1,4-diazabicyclo-[2.2.2]-octane, triethylenediamine, triethylamine, triethanolamine, dimethyl ethanolamine, methyl diethanolamine, diethanolamine, diethyl ethanolamine, dibutyl ethanolamine, diethyl hexanolamine, N,N,N',N'-tetramethyl ethylenediamine, N,N-dimethyl-1,3-propanediamine, 1,8-diazabicyclo-(5.4.0)-undec-7-ene.

Finally, the binder compositions according to the invention may also contain other auxiliaries and additives D) such as solvents or diluents, flow control agents, antioxidants or UV absorbers.

The process according to the invention is carried out by mixing starting components A) and B) and, optionally, components C) and D) with each another. When solvents or diluents are used as component D), they may either be added to one or more of the individual components or to the mixture of components A) to C). In one particular embodiment, the solvents or diluents are actually present during the production of one or more starting components as previously described in regard to the production of the copolymers. The solvents or diluents should be substantially anhydrous to ensure that the mixtures have an adequate pot life. The solvents or diluents are generally used in the quantities necessary for adjusting the compositions according to the invention to suitable processing viscosities. The solids content of the compositions according to the invention is generally about 20 to 90%. However, it is also possible, by using suitable low molecular weight copolymers, to even further reduce the solvent or diluent content or to manage without these auxiliaries altogether.

In one preferred embodiment of the process according to the invention, component B) does not contain any groups which are reactive with anhydride groups in the absence of moisture and the blocked amino groups are entirely based on hexahydropyrimidine, tetrahydroimidazole, aldimine, ketimine and/or oxazolidine groups. These preferred compositions contain about 40 to 90 parts by weight of coponent A) and about 10 to 60 parts by weight of component B).

The quantitative ratios in which components A) and B) are used are generally selected so that for each blocked amino group of component B), there are 0.2 to 8, preferably 0.5 to 4 and more preferably 0.8 to 2 carbonate and anhydride groups in component A). In general, a larger excess of carbonate and anhydride groups within these ranges will be selected when the other components contain reactive groups which react with carbonate or anhydride groups in the absence of moisture. These groups include, in particular, primary or secondary amino groups and/or alcoholic hydroxyl groups which may be present component B) in addition to the blocked amino groups. However, alcoholic hydroxyl groups are generally inert to carbonate and anhydride groups at room temperature so that the hydroxyl groups are only considered to be reactive with anhydride groups when they are used in the form of low-volatility alcohols which do not evaporate during subsequent processing of the compositions to form coatings at relatively high temperatures.

Complex mixtures containing amide groups (through reaction of the anhydride groups with amino groups) or urethane groups (through reaction of carbonate groups with amino groups) may be formed during preparation of the compositions according to the invention, particularly when compounds containing free primary or secondary amino groups in addition to the blocked amino groups are used as component B). Accordingly, in the context of the invention, the expression "binder composition" encompasses pure mixtures of components A) and B) in which no reaction products formed from the individual components are present; systems in which such reaction products are present in addition to the individual components; and systems which consist exclusively of such reaction products. In addition, in all variants of the process according to the invention, it is important to ensure that the molar ratio of anhydride groups and carbonate groups to blocked amino groups (after any reaction between anhydride or carbonate groups with unblocked primary or secondary amino groups) is 0.5:1 to 4:1. An excess of anhydride or carbonate groups should be also be present when the individual components contain alcoholic hydroxyl groups because even though these groups are substantially inert at room temperature, they are reactive with anhydride groups at elevated temperatures as previously discussed.

In addition, the phrase "blocked polyamines B) containing hydrogen atoms reactive to anhydride or carbonate groups" is understood in the context of the invention to mean not only blocked polyamines which contain reactive hydrogen atoms in blocked form, but also blocked polyamines which are present in admixture with excess quantities polyamines or hydroxylamines used for their production.

During the use of the binder compositions according to the invention, it is generally immaterial whether the reaction between the copolymers A) and the unblocked groups which are reactive with anhydride or carbonate groups is complete. However, it is possible, if desired, to terminate this reaction before the use according to the invention by briefly heating the binder composition to about 40° to 100° C. Otherwise, the process according to the invention is preferably carried out at room temperature.

Any mixtures of different individual components A) and B) and, optionally, C) and D) are suitable for the use in accordance with the present invention.

The binder compositions according to the invention are generally liquid at room temperature, possess adequate stability in storage in the absence of water and, after application to a substrate, generally harden rapidly in the presence of atmospheric moisture.

Films crosslinked at room temperature are generally obtained. The hardening process can be further accelerated by drying at relatively high temperatures. Temperatures of about 80° to 130° C. and drying times of about 10 to 30 minutes are advantageous.

When blocked amino groups which are particularly stable to hydrolysis are present, the use of elevated temperatures may be necessary to obtain optimum properties.

The paints and coating compositions, which contain the binder compositions according to the invention as binders, may also contain the known auxiliaries and additives typically used in paint technology such as pigments, fillers, flow control agents, antioxidants and UV absorbers. These auxiliaries and additives should be anhydrous and are preferably incorporated into the starting components, preferably component A), before the process according to the invention is carried out.

The paints and coating compositions containing the products according to the invention as binders generally have a pot life of 1 to 48 hours in the absence of moisture. However, the pot life can be increased or decreased as required by the choice of the starting components. The paints and coating compositions may be applied to suitable substrates by standard methods, for example, by spray coating, spread coating, dip coating, flood coating, casting, roll coating. Suitable substrates, which may be pretreated, include metal, wood, glass, ceramic, stone, concrete, plastics, textiles, leather, cardboard and paper.

In the following examples, all percentages and parts are by weight, unless otherwise stated.

EXAMPLES

I) General procedure for the production of copolymers A1 to A5 containing carbonate and anhydride groups Part I was introduced into a 3 liter reaction vessel equipped with a stirrer and with a heating and cooling system and heated to the reaction temperature. Part II (added over a total period of 2 hours) and part III (added over a total period of 2.5 hours) were then added beginning at the same time, followed by stirring for 2 hours at the reaction temperature.

The reaction temperature and the compositions of parts I, II and III are shown in Table I together with the characteristic data of the copolymers obtained.

TABLE I

| Copolymers | (Quantities in g) $A_1$ | $A_2$ | $A_3$ | $A_4$ | $A_5$ |
|---|---|---|---|---|---|
| Part I | | | | | |
| Butyl acetate | 680 | 680 | 680 | | |
| Xylene | | | | 680 | 680 |
| Part II | | | | | |
| Butyl acrylate | 468 | | 351 | | |
| Methyl methacrylate | 293 | | 351 | 234 | 410 |
| Styrene | 257 | 351 | 199 | 328 | 351 |
| Butyl methacrylate | | 410 | | 469 | |
| Ethyl acrylate | | 258 | | | |
| Ethyl hexyl methacrylate | | | 117 | | 281 |
| Maleic anhydride | 94 | 76 | 59 | 117 | 82 |
| (2-Oxo-1,3-dioxolan-4-yl)-methyl methacrylate | 59 | 76 | 94 | 23 | 47 |
| Part III | | | | | |
| Tert.-butylperoxy-2-ethyl hexanoate (70%) | 70 | 70 | 70 | 70 | 70 |
| Butyl acetate | 79 | 79 | 79 | | |
| Xylene | | | | 79 | 79 |
| Reaction temperature (°C.) | 120 | 120 | 120 | 120 | 120 |
| Solids content (%) | 59.0 | 59.5 | 59.0 | 59.3 | 59.4 |

TABLE I-continued

| Copolymers | (Quantities in g) $A_1$ | $A_2$ | $A_3$ | $A_4$ | $A_5$ |
|---|---|---|---|---|---|
| Viscosity (23° C., mPa.s) | 1477 | 1615 | 1909 | 9423 | 17734 |

II) Production of component B)

$B_1$ 513 g cyclohexane and 456 g isobutyraldehyde were introduced under nitrogen into a 2 liter reaction vessel equipped with a stirrer and with a heating and cooling system. 529.8 g 1-amino-3-(methylamino)-propane were added dropwise at 10° C. (ice bath cooling), followed by stirring for 1 hour at 10° C. The reaction mixture was then heated at the reflux temperature until no more water was removed. Cyclohexane and excess isobutyraldehyde were then distilled off and the hexahydropyrimidine crosslinker $B_1$ was obtained.

$B_2$

In a 3 liter reaction vessel equipped with a stirrer and with a heating and cooling system, 680 g isophoronediamine, 1000 g methyl isobutyl ketone and 560 g toluene were refluxed under nitrogen on a water separator until the theoretical quantity of water had been removed (144 g). Toluene and excess methyl isobutyl ketone were then distilled off and the bisketimine crosslinker $B_2$ was obtained.

$B_3$ a) 1050 g diethanolamine and 615 g cyclohexane are introduced under nitrogen into a 4 liter reaction vessel equipped with a stirrer and with a heating and cooling system. 1408 g 2-ethyl hexanal were then added dropwise at room temperature. The temperature slowly increased. The mixture was kept at the reflux temperature until the removal of water was complete. Cyclohexane and excess 2-ethyl hexanal were then distilled off. An oxazolidine precursor $B_3$a) was obtained.

b) Production of $B_3$ 200.6 g of an isocyanurate polyisocyanate based on hexamethylene diisocyanate, which contains N,N'N''-tris-(6-isocyanatohexyl)-isocyanurate, and 207 g butyl acetate were introduced under nitrogen into a reaction vessel equipped with a stirrer and with a heating and cooling system and heated to 60° C. After the dropwise addition of 286.7 g of the oxazolidine precursor $B_3$a), the reaction mixture was kept at 70° C. for 10 hours. A 70% solution of crosslinker $B_3$ containing an average of 3 oxazolidine groups was obtained.

III) Production of the binder compositions according to the invention

The copolymers A) and crosslinkers B) and components C) and D), if present, were mixed together at room temperature and the resulting mixture was adjusted to a processable viscosity, if necessary by the addition of an organic solvent or diluent.

The films were applied to degreased steel plates by a film applicator. The films had a wet film thickness of 150 to 180 μm. After drying for 24 hours at room temperature, crosslinked films with very good mechanical and optical properties were obtained.

The solvent resistance was determined by a rubbing test using a cotton wool plug impregnated with methyl isobutyl ketone. The result of this test was expressed as the number of double rubs before the film showed a visible change. More than 200 double rubs were not carried out.

The components of the binder compositions and the solvent resistance as a measure of the degree of cross-linking are shown in Table II below.

TABLE II (Quantities in g)

| Copolymers | 1 | 2 | 3 | 4 | 5 | 6 | 7 | 8 |
|---|---|---|---|---|---|---|---|---|
| Component (A) | 50.0 g $A_1$ | 50.0 g $A_2$ | 50.0 g $A_3$ | 50.0 g $A_4$ | 50.0 g $A_5$ | 50.0 g $A_1$ | 50.0 g $A_2$ | 50.0 g $A_3$ |
| Component (B) | 2.3 g $B_1$ | 2.2 g $B_1$ | 2.0 g $B_1$ | 2.3 g $B_1$ | 2.0 g $B_1$ | 5.5 g $B_2$ | 5.0 g $B_2$ | 4.5 g $B_2$ |
| Butyl acetate | 8.0 g | 8.0 g | 8.0 g | 16 g | 25 g | 12.5 g | 12.5 g | 12.5 g |
| Pot life | >6 h | >6 h | >6 h | >6 h | >6 h | >6 h | >6 h | >6 h |
| MIBK rubbing test after 24 h at room temperature number of double rubs | 100 | 120 | 100 | 140 | 160 | 140 | 120 | 150 |
| Molar ratio (anhydride and carbonate groups): NH (after hydrolytic release) | 1:1 | 1:1 | 1:1 | 1:1 | 1:1 | 1:1 | 1:1 | 1:1 |

| Copolymers | 9 | 10 | 11 | 12 | 13 | 14 | 15 |
|---|---|---|---|---|---|---|---|
| Component (A) | 50.0 g $A_4$ | 50.0 g $A_5$ | 50.0 g $A_1$ | 50.0 g $A_2$ | 50.0 g $A_3$ | 50.0 g $A_4$ | 50.0 g $A_5$ |
| Component (B) | 5.5 g $B_2$ | 4.5 g $B_2$ | 17.5 g $B_3$ | 16.0 g $B_3$ | 15.0 g $B_3$ | 18.0 g $B_3$ | 15.0 g $B_3$ |
| Butyl acetate | 20.0 g | 25.0 g | 25.0 g | 25.0 g | 25.0 g | 30.0 g | 40.0 g |
| Pot life | >6 h | >6 h | >6 h | >6 h | >6 h | >6 h | >6 h |
| MIBK rubbing test after 24 h at room temperature number of double rubs | 200 | 200 | 200 | 200 | 200 | 200 | 200 |
| Molar ratio (anhydride and carbonate groups): NH (after hydrolytic release) | 1:1 | 1:1 | 1:1 | 1:1 | 1:1 | 1:1 | 1:1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A moisture-hardening binder composition comprising

A) 30 to 99 parts by weight of at least one copolymer prepared from olefinically unsaturated compounds, having a weight average molecular weight of about 1,500 to 75,000 and containing both carbonate groups and intramolecular carboxylic anhydride groups, said copolymer having an anhydride equivalent weight of 327 to 9,800 and a carbonate equivalent weight of 465 to 18,600 and B) 1 to 70 parts by weight of at least one organic polyamine containing blocked amino groups, said binder composition containing a total of 0.2 to 8 anhydride and carbonate groups for each blocked amino group.

2. The binder composition of claim 1 wherein said copolymer are obtained by the radical-initiated copolymerization of a) 1 to 30 parts by weight of at least one copolymerizable monomer containing anhydride groups, b) 1 to 40 parts by weight of at least one copolymerizable monomer containing carbonate groups and c) 30 to 98 parts by weight of at least one copolymerizable monomer corresponding to general formulas I, II, III :

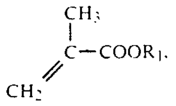
I

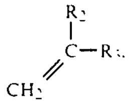
II

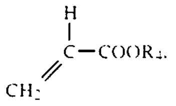
III wherein $R_1$ is a linear or branched, aliphatic $C_{1-18}$ hydrocarbon radical, or a cycloaliphatic $C_5$–$C_{10}$ hydrocarbon radical $R_2$ is hydrogen, a methyl or ethyl group or a chlorine or fluorine atom, $R_3$ is an aromatic $C_{6-12}$ hydrocarbon radical which may contain one or more aliphatic substituents, a nitrile group, a $C_{2-9}$ carboxylate group, a $C_{2-7}$ alkoxy group or an amino carbonyl group which may contain at the nitrogen one or more $C_{1-6}$ alkyl substituents optionally containing ether bridges and $R_4$ corresponds to RI, but need not be identical with $R_1$.

3. The binder composition of claim 2 wherein component a) comprises maleic anhydride.

4. The binder composition of claim 2 wherein component b) comprises (2-oxo-1,3-dioxolan-4-yl)-methyl methacrylate.

5. The binder composition of claim 3 wherein component b) comprises (2-oxo-1,3-dioxolan-4-yl)-methyl methacrylate.

6. The binder composition of claim 1 the blocked amino groups of component B) comprise a member selected from the groups consisting of aldimine groups, ketimine groups, oxazolidine groups, hexahydropyrimidine groups, tetrahydroimidazole groups and mixtures thereof.

7. The binder composition of claim 2 the blocked amino groups of component B) comprise a member selected from the groups consisting of aldimine groups, ketimine groups, oxazolidine groups, hexahydropyrimidine groups, tetrahydroimidazole groups and mixtures thereof.

8. The binder composition of claim 3 the blocked amino groups of component B) comprise a member selected from the groups consisting of aldimine groups, ketimine groups, oxazolidine groups, hexahydropyrimidine groups, tetrahydroimidazole groups and mixtures thereof.

9. The binder composition of claim 4 the blocked amino groups of component B) comprise a member selected from the groups consisting of aldimine groups, ketimine groups, oxazolidine groups, hexahydropyrimidine groups, tetrahydroimidazole groups and mixtures thereof.

10. The binder composition of claim 5 the blocked amino groups of component B) comprise a member selected from the groups consisting of aldimine groups, ketimine groups, oxazolidine groups, hexahydropyrimidine groups, tetrahydroimidazole groups and mixtures thereof.

11. The binder composition of claim 1 which further comprises a catalyst for the reaction between amino groups and either anhydride groups or carbonate groups.

* * * * *